United States Patent
Diaz (10) Patent No.: US 7,786,384 B2
(45) Date of Patent: Aug. 31, 2010

(54) EFFICIENT HIGH-AMPACITY BOWL-SHAPED TUBULAR CONDUCTORS

(76) Inventor: Mauricio Diaz, Blvd. Apodaca 1000, Apodaca, NL (MX) 66600

(*) Notice: Subject to any disclaimer, the term of this patent is extended or adjusted under 35 U.S.C. 154(b) by 127 days.

(21) Appl. No.: 12/201,138

(22) Filed: Aug. 29, 2008

(65) Prior Publication Data
US 2010/0051342 A1    Mar. 4, 2010

(51) Int. Cl.
H02G 3/06        (2006.01)
(52) U.S. Cl. ................................... 174/88 B
(58) Field of Classification Search ............ 174/88 B, 174/149 B, 68.1, 68.2, 70 B, 72 B, 99 B
See application file for complete search history.

(56) References Cited

U.S. PATENT DOCUMENTS

| | | | |
|---|---|---|---|
| 3,793,564 | A | 2/1974 | Salvati et al. |
| 4,030,794 | A | 6/1977 | Rozenboom et al. |
| 6,040,976 | A | 3/2000 | Bruner et al. |
| 6,111,745 | A | 8/2000 | Wilkie, II et al. |
| 6,489,567 | B2 | 12/2002 | Zachrai |
| 6,616,465 | B1 | 9/2003 | Fontana et al. |
| 6,781,818 | B2 | 8/2004 | Josten et al. |
| 6,786,749 | B2 | 9/2004 | Meiners et al. |
| 6,888,066 | B1 | 5/2005 | Wiant et al. |
| 6,934,147 | B2 | 8/2005 | Miller et al. |
| 7,091,417 | B1 | 8/2006 | Jur et al. |
| 7,173,811 | B2 | 2/2007 | Abrahamsen et al. |
| 7,449,635 | B2 * | 11/2008 | Wiant ................. 174/68.2 |
| 2001/0034149 | A1 | 10/2001 | Bernier et al. |
| 2005/0077072 | A1 | 4/2005 | Wiant et al. |
| 2008/0007896 | A1 | 1/2008 | Tsuchiya et al. |

FOREIGN PATENT DOCUMENTS

WO   WO 2006/076746   *   7/2006

OTHER PUBLICATIONS

Web pages printed from http://www.cda.org.uk/megab2/elecapps/pub22/sec5.htm (Downloaded Sep. 29, 2009); 8 pages.
Web pages printed from http://www.cda.org.uk/megab2/elecapps/pub22/sec4.htm#Skin%20Effect (Downloaded Sep. 29, 2009); 9 pages.
P. Silvester, "The Accurate Calculation of Skin Effect in Conductors of Complicated Shape," IEEE Transactions on Power Apparatus and Systems, vol. Pas-87, No. 3; pp. 735-742 Mar. 1968.

(Continued)

*Primary Examiner*—Chau N Nguyen (57) ABSTRACT

A high ampacity busbar includes a pair of oppositely facing bowl-shaped conductors, each of whose cross sections resembles half of a hexagon or an open isosceles trapezoid, separated by an air gap in both horizontal and vertical configurations. The air gap increases cooling efficiency by natural convection by exposing more surface area of the conductors directly to the air flow within the electrical distribution equipment cabinet. As a result, the overall temperature of the bus system is reduced. The shaped conductors have smoother transitions presented to the electrical current between the bends of the conductors. These smooth transitions improve current distribution throughout the conductor, reducing skin effects. As a result of improved thermal dissipation and reduced skin effects, the amount of copper needed to maintain the same ampacity is significantly reduced. Magnetic shields can be placed between adjacent busbars, reducing proximity effects.

20 Claims, 6 Drawing Sheets

OTHER PUBLICATIONS

Written Opinion corresponding to co-pending International Patent Application Serial No. PCT/US2009/055048, European Patent Office, dated Nov. 16, 2009, 6 pages.

International Search Report corresponding to co-pending International Patent Application Serial No. PCT/US2009/055048, European Patent Office, dated Nov. 16, 2009, 3 pages.

* cited by examiner

EFFICIENT HIGH-AMPACITY BOWL-SHAPED TUBULAR CONDUCTORS

FIELD OF THE INVENTION

The present invention relates generally to bus systems, and in particular, to a bus system including efficient high-ampacity bowl-shaped tubular conductors.

BACKGROUND OF THE INVENTION

Electrical distribution equipment, including switchboards, switchgears, and motor control centers, use busbar conductors to connect circuit breakers and other protection equipment to loads. Conventionally, the busbar conductors include one or more vertical busbars, conventionally called "risers," and one or more horizontal busbars. Existing busbar conductors include one or more flat conductors depending upon the desired current rating or ampacity of the distribution equipment. Other risers have an L-shape or U-shaped profile, but as the length of these conductors increases, the temperature of the surrounding air due to natural convection increases, resulting in poor thermal dissipation and current distribution. In the case of flat busbars, to counteract the adverse thermal effects, additional flat busbars are stacked together, but at the cost of an increase in the amount of expensive copper.

A related problem is a phenomenon called the "skin effect," which holds that the current density near the surface of the conductor is greater than at its core. Specially Flat busbar conductors exhibit a relatively poor current distribution due to skin effect because of the planar surfaces and sharp transitions presented to the electrical current. Moreover, in multiphase systems, adjacent busbars are subjected to another undesirable phenomenon called the "proximity effect," which relates to how current flowing through one phase interferes with current flowing through an adjacent phase. As a result of the proximity effect, current tends not to be distributed evenly throughout the conductor cross-section, but rather tends to crowd to the side closest to an adjacent phase conductor. As a result, some laminations of one phase conductor can get hotter than others in the same phase, resulting in uneven current distribution throughout the laminations composing a conducting phase.

Shaped busbars are typically extruded from a mold, which is expensive and it is difficult to modify the mold when changes need to be made to the busbar profile. What is needed is at least an improved busbar system, an improved way of manufacturing busbars, and an improvement in the proximity effect present in existing polyphase busbar systems. The aspects disclosed herein are directed to addressing or solving these and other needs.

SUMMARY OF THE INVENTION

Aspects of the present disclosure are directed to a bus system for use in electrical distribution equipment, which includes generally bowl-shaped busbar conductors for mounting both vertically as well as horizontally for supplying very high amperage (above 2000 amps) alternating current to the electrical distribution system. Compared to prior-art busbar shapes, such as flat, L-shaped, and U-shaped conductors, the bowl-shaped busbar conductors of a phase can be fabricated from less copper, which is an expensive metal, achieve better thermal dissipation and current distribution, and mitigate skin effects and therefore reduce power losses. The bowl-shaped busbar conductors are also relatively stiffer than prior-art busbars.

A particular aspect of the present disclosure also reduces proximity effects on the conducting phases by imposing a vertically oriented magnetic shield made of carbon steel between adjacent pairs of vertical busbars. Proximity effects relate to the undesired tendency of current to favor the conductor surface proximate an adjacent phase conductor, resulting in uneven current distribution through the phase conductor and uneven heating of the busbar conductors. Skin effects exacerbate this proximity-effect phenomenon because electrical current already prefers to distribute itself at the surface of the conductor. The magnetic shield suppresses proximity effects and increases the overall efficiency of the busbars by promoting a more uniform and symmetrical current density through the conductors.

A pair of oppositely facing bowl-shaped conductors, each of whose cross sections resembles half of a hexagon or an open three-sided isosceles trapezoid, are separated by an air gap in both horizontal and vertical configurations, forming an octagonal cross section in which the air gaps form two sides of the octagon. The air gap increases cooling efficiency by natural convection by exposing more surface area of the conductors directly to the air flow within the cabinet in which the busbars are disposed. As a result, the overall temperature of the bus system is reduced. The pair of mirrored bowl-shaped conductors more closely approximates a circular cross section compared to prior-art shapes, forming smoother transitions between the bends of the conductors presented to the electrical current. These smooth transitions improve current distribution throughout the conductor, reducing skin effects. As a result of the improved thermal dissipation and the reduction in skin effects, the overall amount of copper or other conductive material needed for the busbars to support the same current rating as prior-art busbars is significantly reduced.

The present busbars are easily manufactured by making two 60 degree bends in the sides of a flat sheet of conductive material. This manufacturing process is repeatable for both the horizontal and vertical busbars, and avoids any expensive and time-consuming extrusion techniques.

Finding the precise balance of optimal thermal dissipation and power generation is not a trivial matter and involves numerous competing factors and considerations. The present disclosure balances these factors and considerations in a more optimal way compared to prior-art busbar designs.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

DETAILED DESCRIPTION OF THE ILLUSTRATED EMBODIMENTS

Although the invention will be described in connection with certain aspects and/or embodiments, it will be understood that the invention is not limited to those particular aspects and/or embodiments. On the contrary, the invention is intended to cover all alternatives, modifications, and equivalent arrangements as may be included within the spirit and scope of the invention as defined by the appended claims.

Figure 1:
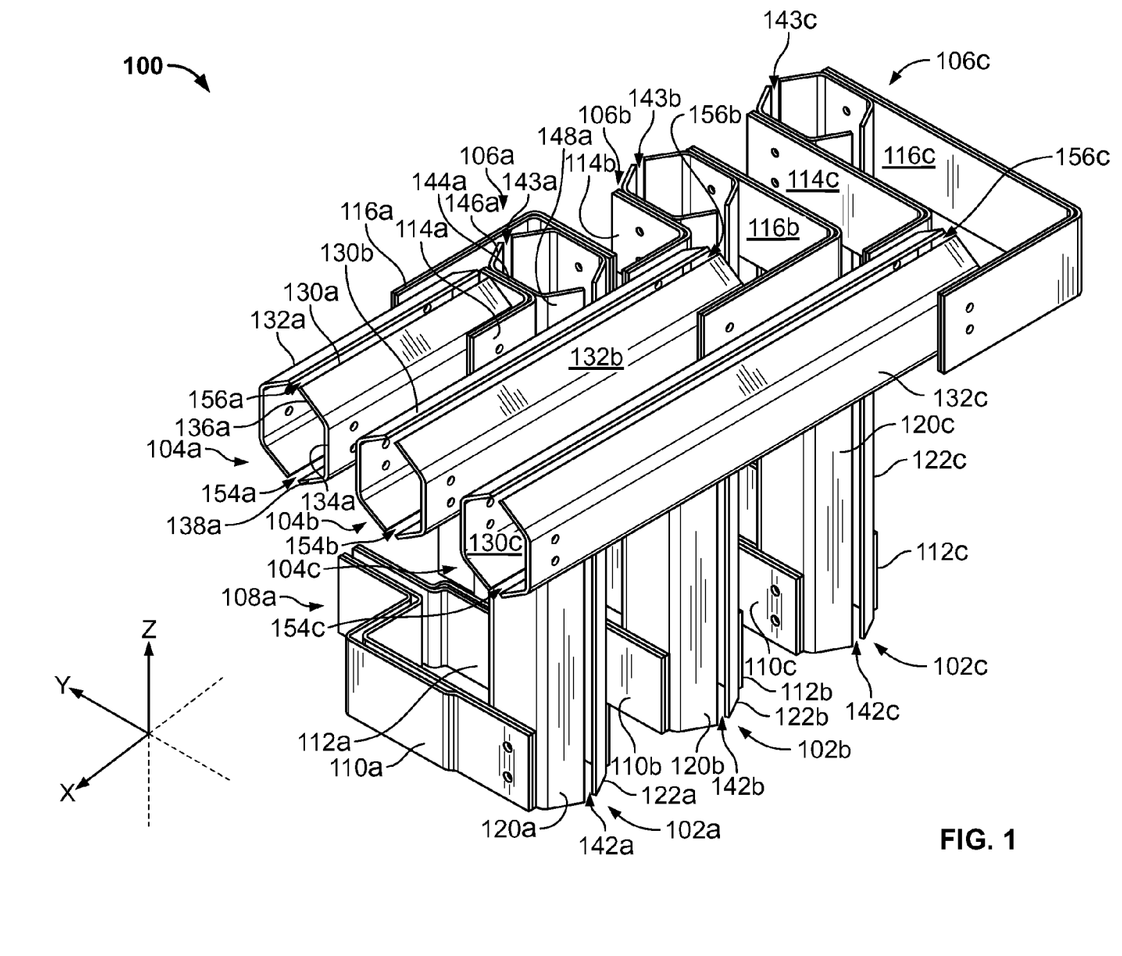
FIG. 1 is an isometric view of a busbar system having approximately bowl-shaped vertical and horizontal busbars connected by transition connectors.
Figure 2:
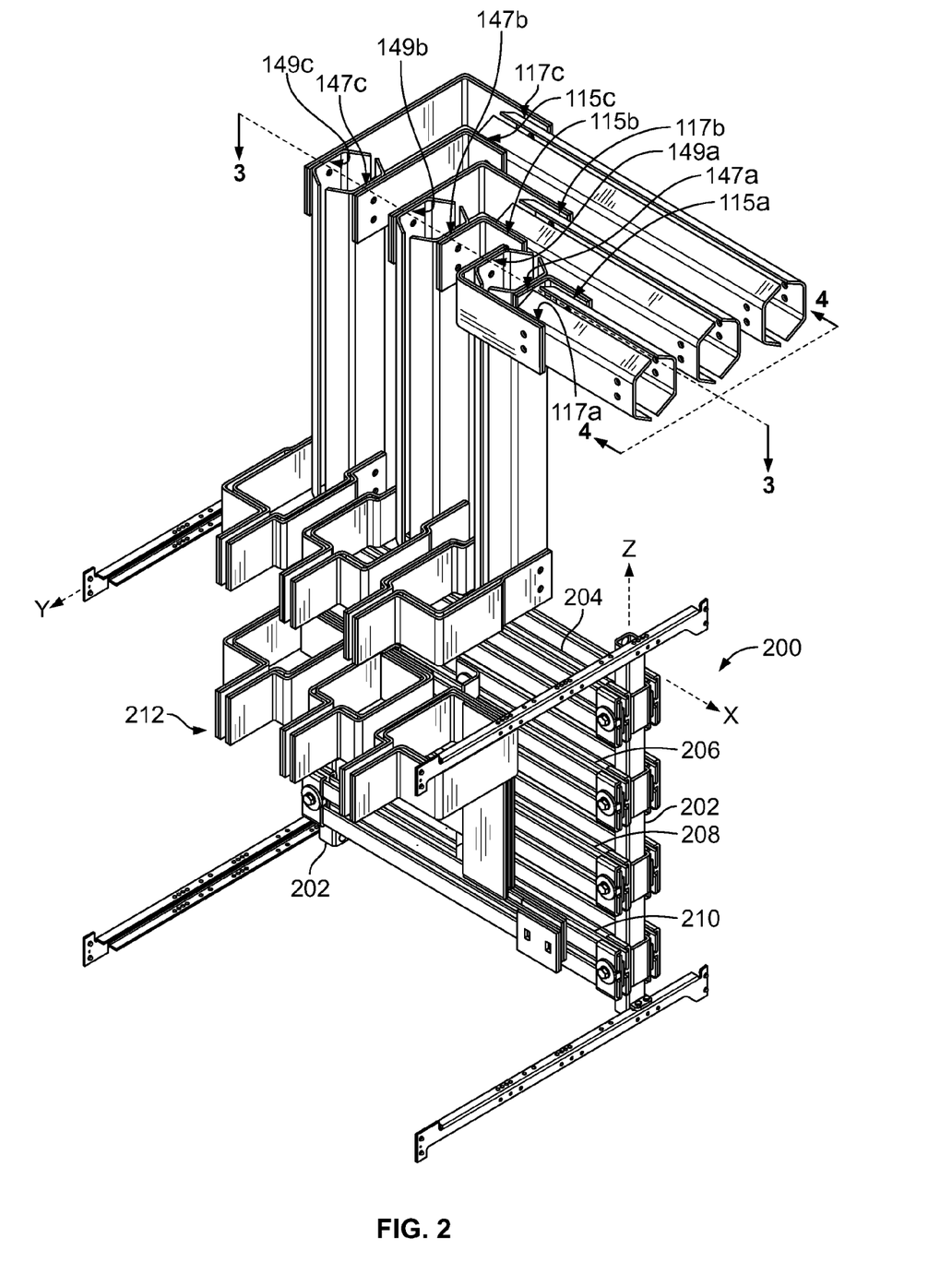
FIG. 2 is a different isometric view of the busbar system shown in FIG. 1 incorporated with a sub-assembly that includes runbacks (conductors) for coupling with the runbacks connected to the vertical busbars.

An isometric view of a bus system 100 for use in electrical distribution equipment such as switchgears, switchboards, and motor control centers, is shown in FIGS. 1 and 2. FIG. 2 shows the bus system 100 incorporated with a sub-assembly 200 for a cabinet of the electrical distribution equipment. The bus system 100 includes three vertical busbars or risers 102a, b,c, one for each phase of a polyphase alternating current distributed by the electrical distribution equipment (not shown). The top portions of the three vertical busbars 102a, b,c are electrically connected to base portions of three horizontal busbars 104a,b,c by respective transition connectors 106a,b,c. The busbars 102, 104 are made of a conductive material that includes copper. Base portions of the three vertical busbars 102a,b,c are connected to respective runbacks 108a,b,c, for connection to, for example, protection equipment such as a circuit breaker. The first runback 108a includes first and second runback sections 110a, 112a. Likewise, the second runback 108b includes first and second runback sections 110b, 112b, and the third runback 108c includes first and second runback sections 110c, 112c. The first vertical busbar 102a includes a first vertical conductor 120a and a second vertical conductor 122a. Likewise, the second vertical busbar 102b includes a first vertical conductor 120b and a second vertical conductor 122b, and the third vertical busbar 102c includes a first vertical conductor 120c and a second vertical conductor 122c. The first horizontal busbar 104a includes a first horizontal conductor 130a and a second horizontal conductor 132a. Likewise, the second horizontal busbar 104b includes a first horizontal conductor 130b and a second horizontal conductor 132b, and the third horizontal busbar 104c includes a first horizontal conductor 130c and a second horizontal conductor 132c.

The vertical busbars 102a,b,c and the horizontal busbars 104a,b,c extend along directions that are generally orthogonal with respect to one another. Thus, in FIG. 1, the horizontal busbars 104a,b,c extend along an x-axis direction (e.g., relative to ground or earth or transverse the direction of gravity) while the vertical busbars 102a,b,c extend along a z-axis direction. The runbacks 108a,b,c extend along a y-axis direction orthogonal to the x-axis direction along which the horizontal busbars 104a,b,c extend.

The first transition connector 106a includes a first connector section 114a and a second connector section 116a. Likewise, the second transition connector 106b includes a first connector section 114b and a second connector section 116b, and the third transition connector 106c includes a first connector section 114c and a second connector section 116c. In other words, each connector member 114, 116 includes a section for connection to each conductor half 130, 132 of the busbar 104. The connectors 114, 116 are preferably connected, on the one hand, to the base, or bight portions 134, 135 (referring to the flat, non-angled portion of the bowl-shaped conductors 130, 132), of the conductor halves 130, 132 of the horizontal busbars 104, and, on the other hand, to the base or bight portions 144, 145 of the conductor halves 120, 122 of the vertical busbars 102. For example, as illustrated, the first connector section 114a is connected to the bight portion 134a of the first horizontal conductor 130a of the first horizontal busbar 104a at an end 115a of the first horizontal conductor 130a and to an end 147a of the first vertical conductor 120a of the first vertical busbar 102a at a bight portion 144a of the first vertical conductor 120a. Likewise, the second connector section 116a is connected to the bight portion 135a of the second horizontal conductor 132a of the first horizontal busbar 104a at an end 117a of the second horizontal conductor 132a and to an end 149a of the second vertical conductor 122a of the first vertical busbar 102a at a bight portion 145a of the second vertical conductor 122a. The other first connector sections 114b,c and second connector sections 116b,c are connected similarly to respective bight portions 134b,c, 135b,c, 144b,c, 145b,c at respective ends 115b,c, 117b,c, 147b,c, 149b,c as illustrated in FIGS. 1-4.

Figure 3:
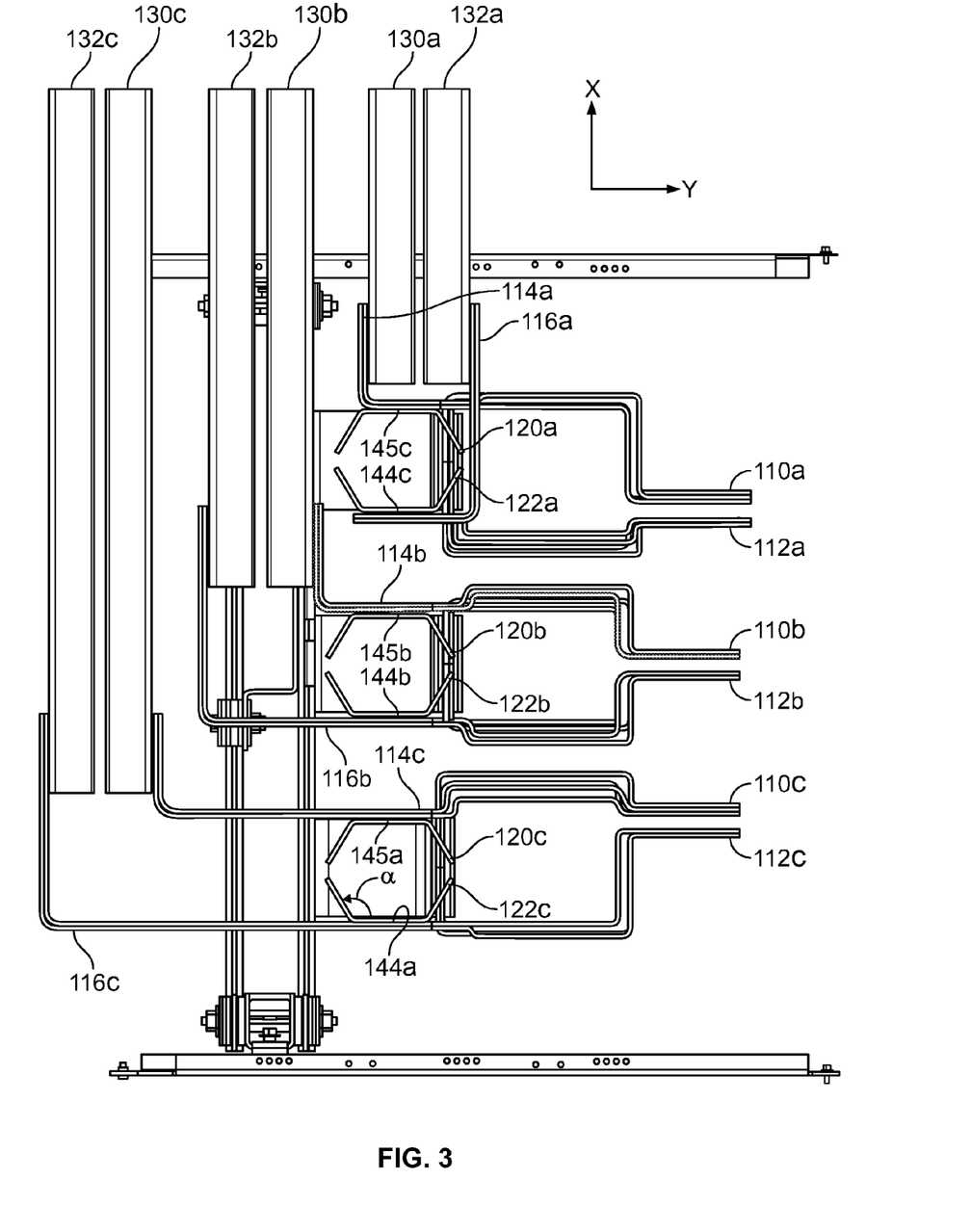
FIG. 3 is a top view of the busbar system and sub-assembly shown in FIG. 2 taken along view A-A.
Figure 4:
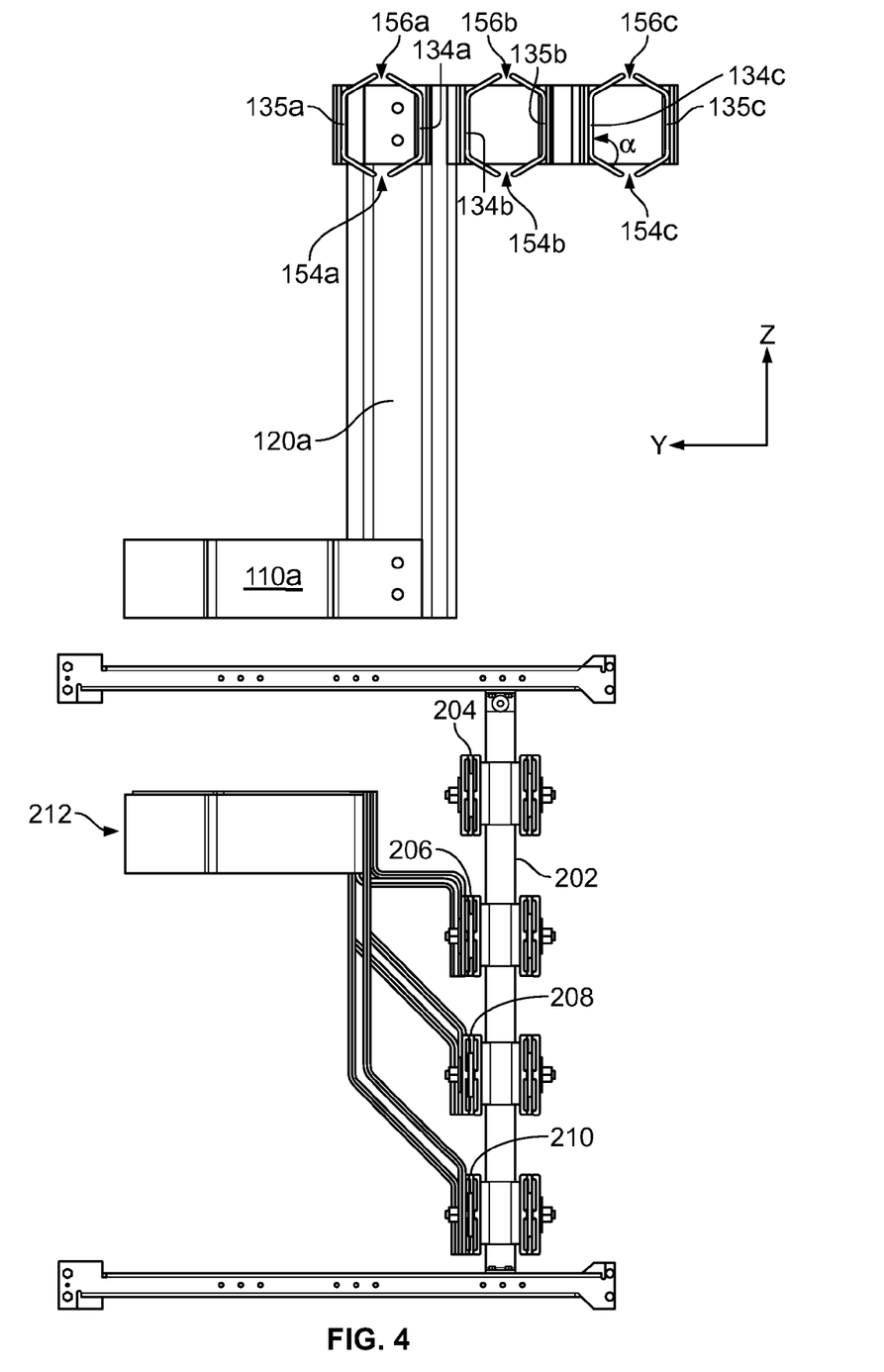
FIG. 4 is a side view of the busbar system and sub-assembly shown in FIG. 2 taken along view B-B.

Each paired conductor, e.g., the first horizontal conductor 130a, includes the bight portion 134a and two side sections 136a, 138a that are both angled away from the bight portion 134a at an obtuse angle, preferably about 120 degrees (shown as angle α in FIGS. 3 and 4). Likewise, the first vertical conductor 120a includes the bight portion 144a and two side sections 146a, 148a that are both angled away from the bight portion 144a at an obtuse angle, also preferably about 120 degrees (angle α in FIGS. 3 and 4).

The other conductors 120b, 120c, 122a, 122b, 122c, 130b, 130c, 132a, 132b, 132c also include respective bight portions connecting two side conductor sections at respective ends in the same manner as the conductors 130a, 120a described above. Each of the first and second conductors of the vertical and horizontal busbars 102, 104 are generally bowl-shaped or resemble half of a regular hexagon, and are mirror-images of one another, and together each pair when separated by a gap forms an approximately octagonal shape (the gaps forming two of the "sides" of the octagon). Put differently, the air volume between the conductor halves of the busbars 102, 104 has a generally octagonal cross section. Each pair of first and second conductors 120, 122, 130, 132 oppositely face one another. An important aspect of the present disclosure is the presence of an air gap between the conductor pairs of the busbars described herein. The first vertical busbar 102a includes gaps 142a, 143a between the first vertical conductor 120a and the second vertical conductor 122a, respectively. The gaps 142a, 143a preferably have the same dimensions. The other vertical busbars 102b,c include identical gap pairs 142b, 143b and 142c, 143c, respectively, between the first and vertical conductors 120b, 122b and 120c, 122c. Likewise, the first horizontal busbar 104a includes gaps 154a, 156a between the first horizontal conductor 130a and the second horizontal conductor 132a, respectively. The other horizontal busbars 104b,c also include identical gap pairs 154b, 156b and 154c, 156c, respectively, between the first and second horizontal conductors 130b, 132b and 130c, 132c.

The gaps 142, 143, 154, 156 allow air to vent across the inner surfaces of the conductors 120, 122, 130, 132. Hot air rising by convection up through the vertical conductors 120, 122 is allowed to escape through the gaps 142, 143, resulting in air exchange between the relatively hot inner surfaces of the vertical conductors 120, 122 and cooler air external to the vertical conductors 120, 122. A top view of the vertical busbars 102 is shown in FIG. 3. As the length of the vertical conductors 120, 122 increases, an increasingly greater amount of heat is generated by alternating current having a very high amperage (above 2000 amps), decreasing overall efficiency. The gaps 142, 143 significantly reduce this heat, resulting in improved thermal dissipation compared to prior-art techniques. The optimum size of the gaps can be calculated by conventional boundary layer techniques. Likewise, the gaps 154, 156 in the horizontal conductors 130, 132 allow air exchange between the relatively hot inner surfaces of the horizontal conductors 130, 132 and cooler air external to the horizontal conductors 130, 132. FIG. 4 shows a side view of the bus system 100 as viewed down the lengths of the horizontal busbars 104. Because the gaps 154, 156 are aligned in the vertical direction, heated air rising due to convection passes unhindered through the bottom gap 154 and out of the top gap 156. Again, this arrangement greatly improves thermal dissipation and avoids the need to add additional copper to compensate for the increased temperatures. As a result, the same current rating (also called "ampacity") associated with the busbars can be achieved without an increase in copper. In fact, an overall reduction of copper is achieved as a result of the gaps and/or the approximately hexagonal shape of the paired busbars.

The exposure of more surface area of the vertical and horizontal conductors 102, 104 directly to the airflow greatly improves the cooling efficiency by natural convection of the busbars 102, 104. Air can freely flow between the gaps and will not get trapped inside the vertical conductors 120, 122 or the horizontal conductors 130, 132. The overall temperature of the busbars decreases, which increases the efficiency of the busbars. The favorable effects of the gap-separated bowl-shaped conductor pairs are further enhanced as the length of the conductors increases.

The sub-assembly 200 shown in FIG. 2 includes a pair of bottom risers 202 connecting four sets of through bars 204, 206, 208, 210 for connection to neutral and to each of the three phases. Through bars 206, 208, 210 are connected to respective ones of bottom runbacks 212. The runbacks 108, 212 are conventionally coupled to a protection device, such as a circuit breaker. Current transformers (not shown) are disposed in the space between the runback section pairs 110a, 112a and 110b, 112b and 110c, 112c. The horizontal busbars 104 are coupled to a transformer.

The horizontal and vertical conductors can be manufactured from the same process by bending opposite sides of a flat piece of conductive material, such as one including copper, away from the plane in which the material lies at a 60 degree angle. A 60-degree bend angle is easier to form than a 90-degree bend angle or a rounded extrusion as those ordinarily skilled in the art of forming metals will appreciate. Expensive and time-consuming extrusion techniques are thus also avoided, and a repeatable, reliable manufacturing method of forming the bowl-shaped conductors is achieved. Each side can be formed by bending the material at a distance approximately 25-33% away from the side edge of the flat material.

A significant reduction in the amount of copper needed to support the same ampacity through the busbars is achieved relative to prior-art designs. For example, the conductors 120, 122, 130, 132 generally require 25-30% less copper compared to flat busbar designs of the same rating. A reduction of about 8-9% in copper is generally achieved compared to L-shaped busbar designs of the same rating.

Figure 5:
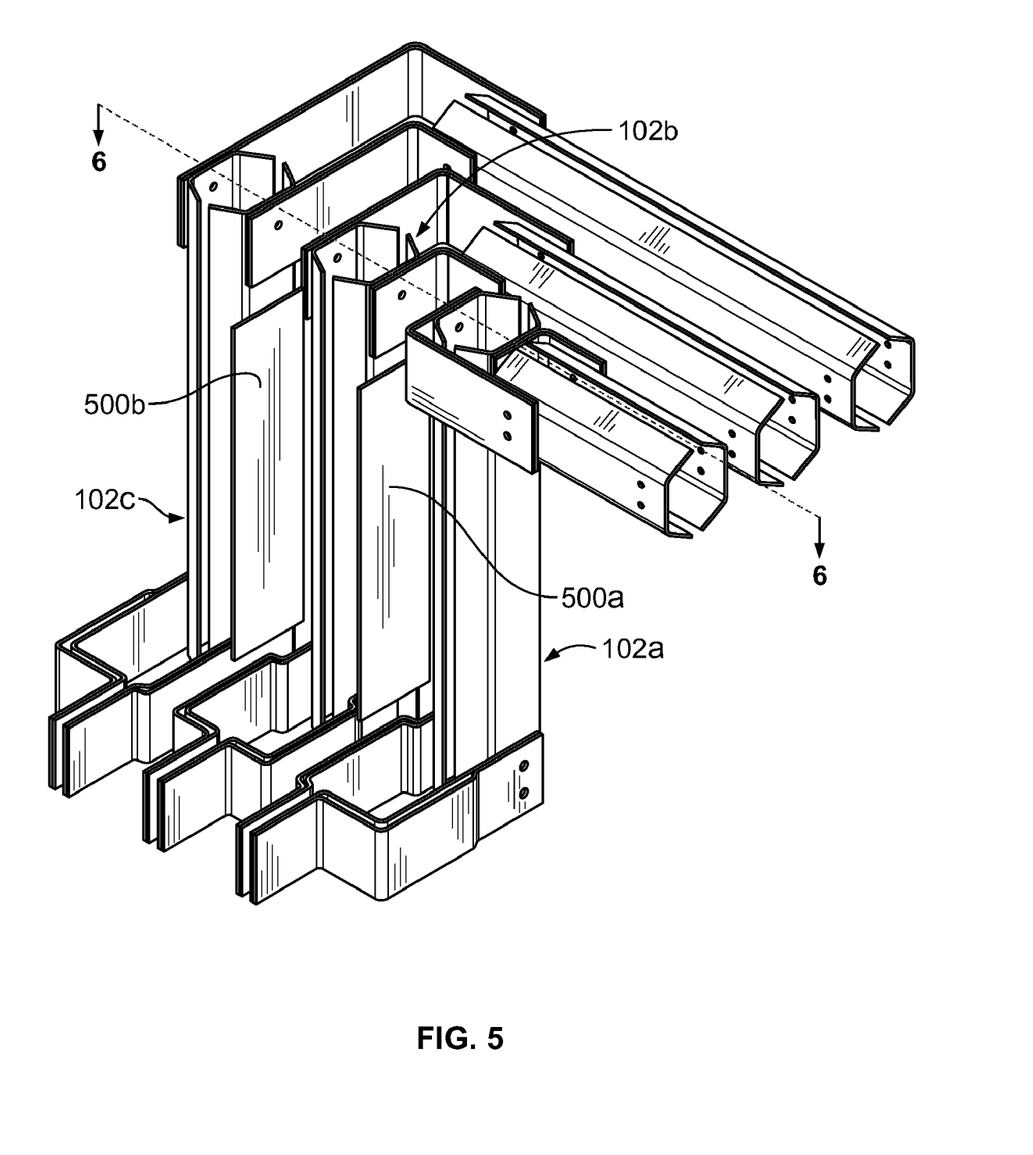
FIG. 5 is an isometric view of a busbar system according to another aspect wherein a vertically oriented magnetic shield is interposed between each adjacent pair of busbars.
Figure 6:
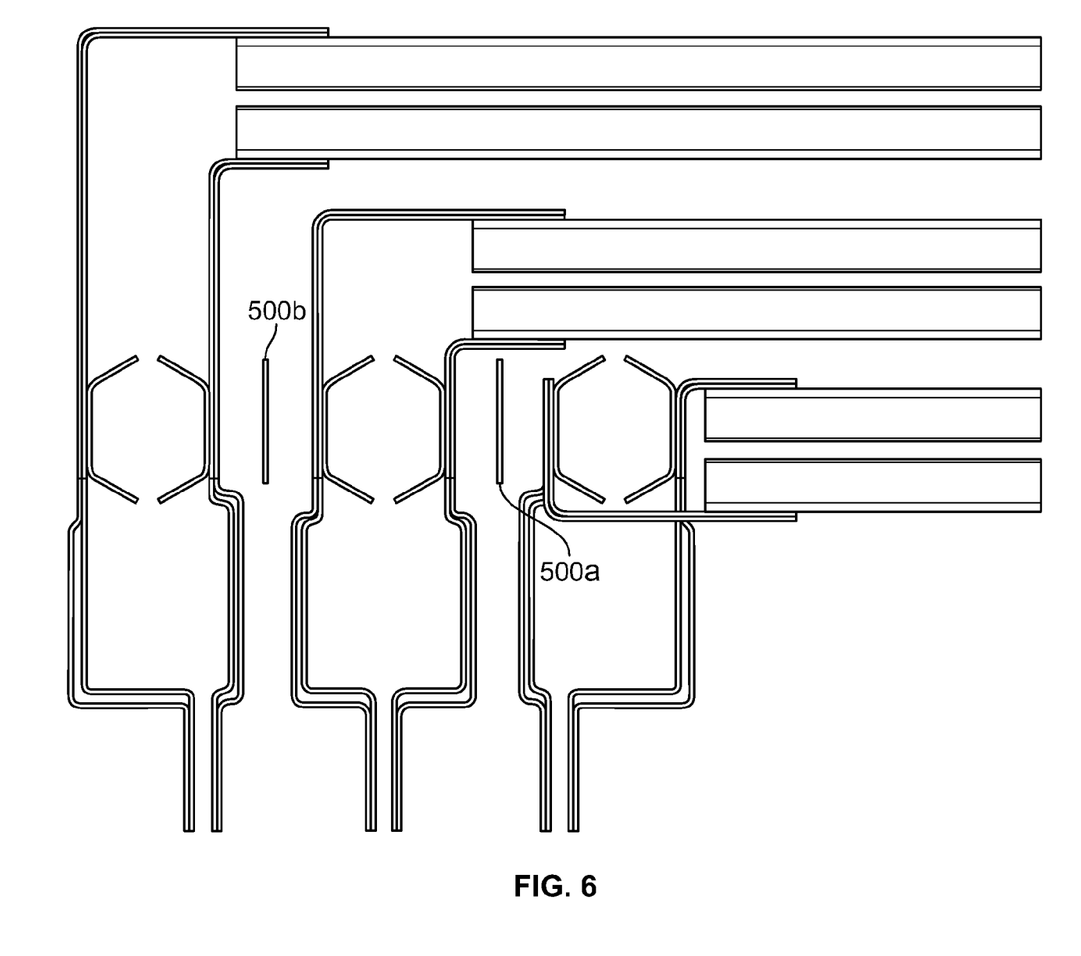
FIG. 6 is a top view of the busbar system shown in FIG. 5 taken along view C-C.

FIG. 5 is an isometric view of the same system bus shown in FIG. 1, except that vertically oriented magnetic shields are introduced between two pairs of adjacent vertical busbars as shown such that the magnetic shields run parallel with the vertical busbars. A magnetic shield 500a is disposed vertically in the space between the first vertical busbar 102a and the second vertical busbar 102b. Another magnetic shield 500b is disposed vertically in the space between the second vertical busbar 102b and the third vertical busbar 102c. FIG. 6 illustrates a top view of the magnetic shields 500a,b. The magnetic shields are made of a magnetic material, preferably carbon steel, and can have a thickness of about 70 to 96 thousands of one inch. The magnetic shields 500a,b reduce proximity effects on the vertical busbars 102. Proximity effects relate to the undesired tendency of current to favor the conductor surface proximate an adjacent phase conductor, interfering with the current distribution in the adjacent phase conductor resulting in uneven current distribution through the conductor and uneven heating of the conductors. Skin effects exacerbate this proximity-effect phenomenon because electrical current already prefers to distribute itself at the surface of the conductor. The magnetic shields 500a,b suppresses proximity effects and increases the overall efficiency of the busbars 102 by promoting a more uniform and symmetrical current density through the conductors 120, 122.

Although the aspects discussed above relate to conductors having a cross-section that approximates half of a hexagon such that each obtuse angle formed between the bight portions 134, 135, 144, 145 and respective side sections 146, 148 of the conductors is 120 degrees (angle α shown in FIGS. 3 and 4), in other aspects, the cross-section can be a three-sided isosceles trapezoid having an obtuse angle other than 120 degrees between the base and respective side sections of the conductors. The busbar system 100 shown in the figures is for distribution of three-phase current, but in other aspects, the conductors disclosed herein can be used in single-phase distribution systems. In single-phase systems, the magnetic shield shown in FIGS. 5-6 would not be needed unless the conductors are proximate other current-carrying conductors. Although the transition connectors 106 are shown with 90 degree bends, in other aspects, the transition connectors 106 are bent at other angles, individually or collectively, depending upon the location of other components in the electrical distribution equipment. An obtuse angle will promote a more uniform current density at the point of transition compared to an orthogonal or acute angle, resulting in a more efficient transfer of current from the vertical busbars 102 to the horizontal busbars 104. Although two bends in the conductors are discussed above to form the approximate bowl-shape, the present disclosure contemplates forming more than two bends to more closely approximate a semicircular shape. The resulting conductors, when placed opposite one another and separated by a gap, have a roughly circular cross section. Thus, at least two bends are contemplated to form a roughly hexagonal cross section air gap between the conductor pairs, but in other aspects, more than two bends can be made to form a more circular cross section. More bends increase manufacturing complexity, so two bends to form the preferred bowl-shape constitute a compromise between approximating a generally circular shape and manufacturing simplicity and compatibility with other components manufactured for the distribution equipment. Finally, although the illustrated gaps between conductors are through-going along the entire length of the conductors, in other aspects, the gaps need not extend along the entire length of the conductors. For example, the conductors may be connected at various points along their lengths, with one or more gaps formed where the conductors are not connected.

While particular aspects, embodiments, and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A bus assembly for electrical distribution equipment, comprising:
   a vertical busbar a first vertical conductor opposing a second vertical conductor;
   a horizontal busbar a first horizontal conductor opposing a second horizontal conductor,
   wherein each of the first and second vertical conductors and each of the first and second horizontal conductors have a bight portion connecting two side conductor sections, each of the side conductor sections being angled away from the bight portion at an obtuse angle; and
   a transition connector including a first connector member having a first surface that connects to the bight portion of the first vertical conductor at an end thereof and a second surface generally perpendicular to the first surface, the second surface connecting to the bight portion of the first horizontal conductor at an end thereof, such that the vertical busbar is generally perpendicular to the horizontal busbar.

2. The bus assembly of claim 1, wherein the transition connector further includes a second connector member having a first surface that connects to the bight portion of the second vertical connector and a second surface generally perpendicular to the first surface, the second surface of the second connector member connecting to the bight portion of the second horizontal conductor.

3. The bus assembly of claim 1, wherein the first vertical conductor, the second vertical conductor, the first horizontal conductor, and the second horizontal conductor each has a shape that approximates a three-sided isosceles trapezoid.

4. The bus assembly of claim 1, wherein the first vertical bus conductor is separated from the second vertical bus conductor by a gap and the first horizontal bus conductor is separated from the second horizontal bus conductor by a gap.

5. The bus assembly of claim 4, wherein a cross section of the vertical busbar has a generally octagonal shape and a cross section of the horizontal busbar has a generally octagonal shape.

6. The bus assembly of claim 4, wherein the first vertical bus conductor and the second vertical bus conductor form therebetween an air volume having a generally octagonal cross section.

7. The bus assembly of claim 1, wherein the first vertical bus conductor and the second vertical bus conductor are mirror-images of one another and the first horizontal bus conductor and the second horizontal bus conductor are mirror-images of one another.

8. The bus assembly of claim 1, wherein the first vertical bus conductor is shaped without extrusion by bending a plate of conductive material to form the respective side conductor surfaces of the first vertical bus conductor.

9. The bus assembly of claim 1, further comprising a second vertical busbar and a third vertical busbar, each of the three vertical busbars carrying respective ones of three phases of a polyphase alternating current.

10. The bus assembly of claim 9, further comprising a second horizontal busbar and a third horizontal busbar, each of the three horizontal busbars carrying respective ones of three phases of the polyphase alternating current.

11. The bus assembly of claim 9, further comprising a magnetic vertical shield between any two of the three vertical busbars.

12. The bus assembly of claim 1, wherein the obtuse angle is about 120 degrees.

13. A bus assembly for electrical distribution equipment, comprising a busbar that includes a first conductor oppositely facing a second conductor, wherein the first conductor and the second conductor each has a bight portion connecting two side surfaces, each of the side surfaces being angled away from the bight portion at an obtuse angle.

14. The bus assembly of claim 13, wherein the busbar is a horizontal busbar oriented horizontally relative to ground or a vertical busbar oriented vertically relative to ground.

15. The bus assembly of claim 13, further comprising a transition connector including a first connector member having a first surface that connects to the bight portion of the first conductor and a second surface that is generally perpendicular to the first surface.

16. The bus assembly of claim 13, wherein the first bus conductor is separated from the second bus conductor by a gap such that a volume between the first bus conductor and the second bus conductor has a generally octagonal cross section.

17. A bus assembly for electrical distribution equipment, comprising:
   a vertical busbar a first vertical conductor opposing a second vertical conductor, wherein each of the first and second vertical conductors has a bight portion connecting two side conductor sections, each of the side conductor sections being angled away from the bight portion at an obtuse angle; and
   a transition connector including a first connector member having a first surface that connects to the bight portion of the first vertical conductor at an end thereof and a second surface generally perpendicular to the first surface.

18. The bus assembly of claim 17, wherein the first vertical bus conductor is separated from the second vertical bus conductor by a gap such that a volume between the first vertical bus conductor and the second vertical bus conductor has a generally octagonal cross section, the first vertical bus conductor being a minor image of the second vertical bus conductor, and wherein the obtuse angle is substantially 120 degrees.

19. The bus assembly of claim 17, further comprising:
   a horizontal busbar that includes a first horizontal conductor opposing a second horizontal conductor,
   wherein each of the first and second horizontal conductors has a bight portion connecting two side conductor sections, each of the side conductor sections being angled away from the bight portion at an obtuse angle, and
   wherein the second surface of the first connector member connects to the bight portion of the first horizontal conductor at an end thereof, such that the vertical busbar is generally perpendicular to the horizontal busbar.

20. The bus assembly of claim 19, wherein the first horizontal bus conductor is separated from the second horizontal bus conductor by a gap such that a volume between the first horizontal bus conductor and the second horizontal bus conductor has a generally octagonal cross section, the first horizontal bus conductor being a mirror image of the second horizontal bus conductor, and wherein the obtuse angle is substantially 120 degrees.

* * * * *